(No Model.)
E. MORGAN.
FRUIT TREE LIMB SUPPORTER.
No. 567,813. Patented Sept. 15, 1896.
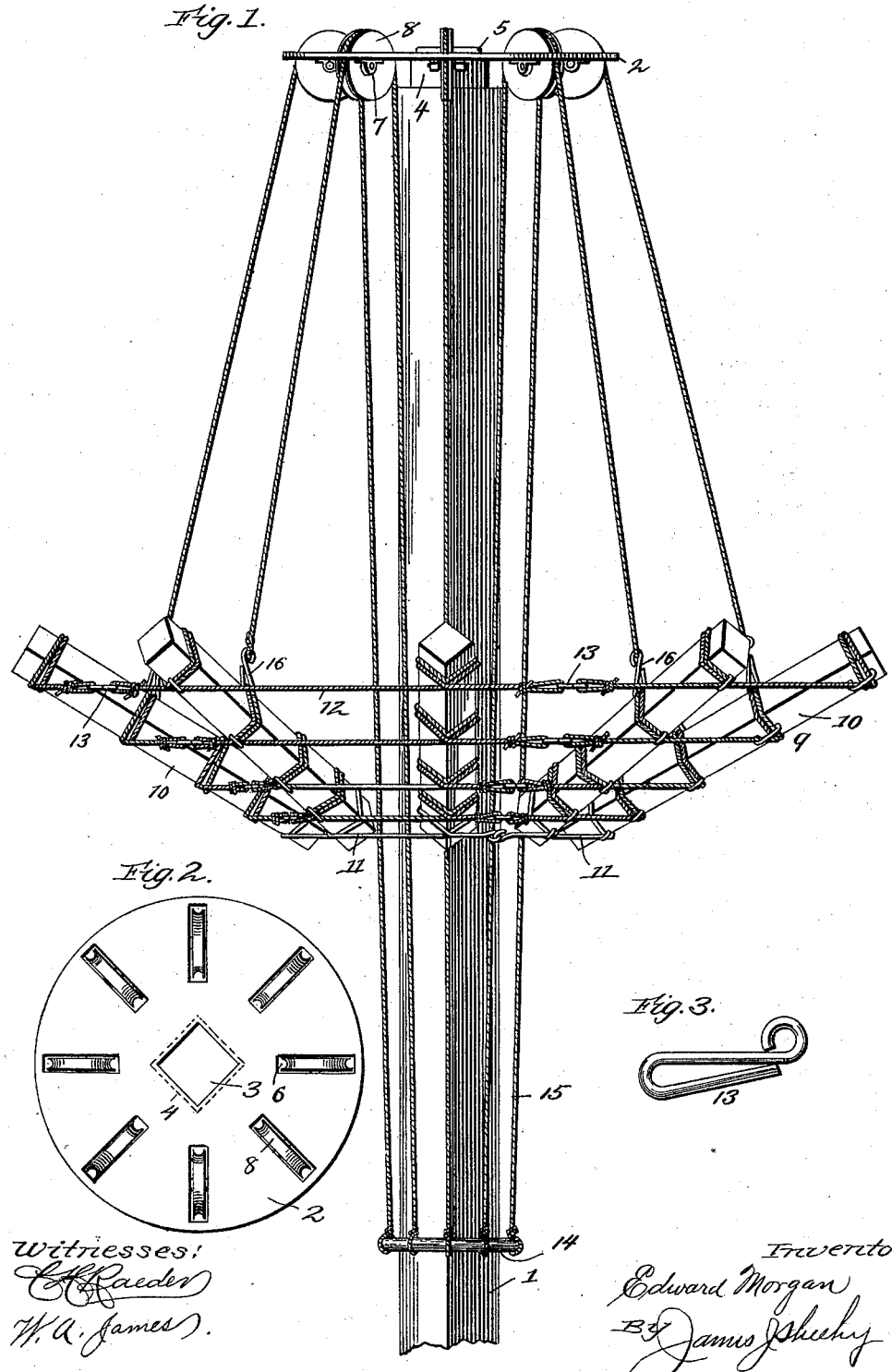

UNITED STATES PATENT OFFICE.

EDWARD MORGAN, OF FRESNO, CALIFORNIA.

FRUIT-TREE-LIMB SUPPORTER.

SPECIFICATION forming part of Letters Patent No. 567,813, dated September 15, 1896.

Application filed January 11, 1896. Serial No. 575,138. (No model.)

*To all whom it may concern:*

Be it known that I, EDWARD MORGAN, a citizen of the United States, residing at Fresno, in the county of Fresno and State of California, have invented certain new and useful Improvements in Fruit-Tree-Limb Supporters; and I do declare the following to be a full, clear, and exact description of the invention, such as will enable others skilled in the art to which it appertains to make and use the same.

My invention relates to improvements in devices for supporting the limbs of fruit-trees, so as to prevent the same from breaking down when they are heavily laden with fruit; and it has for its general object to provide such a device of a simple and durable construction and one in which the cradle or limb-support may be readily raised to a position directly beneath the weighted limbs and may then be raised, with the limbs, until the latter are in their natural position and may be fixed in such position to support the limbs and enable them to withstand the weight of the fruit which they carry.

With the foregoing ends in view the invention will be fully understood from the following description and claims, when taken in conjunction with the accompanying drawings, in which—

Figure 1 is an elevation of my improved device with the lower portion of the center post broken away. Fig. 2 is a plan view of the disk which carries the sheaves, and Fig. 3 is an enlarged elevation of one of the hooks.

In the said drawings similar numerals designate corresponding parts in all the several views.

1 indicates the center post of the improved device. This center post 1 is designed to be arranged at the side of the trunk of the tree to be supported, and it may be secured in its upright position in any suitable manner, as by lashing it to the trunk. At its upper end said post 1 carries a disk 2, which has a central aperture 3 and a collar 4 to receive the reduced upper end 5 of the post and may be secured upon said post, if desirable, by any suitable means. The disk 2 is provided with a series of slots 6 and with lugs 7 on opposite sides of the slots, and in these lugs are journaled the trunnions of peripherally-grooved pulleys or sheaves 8, which are arranged and adapted to turn in the slots 6 of the disk for a purpose presently described.

9 indicates the cradle or limb-support of my improved device. This cradle or limb-support may be of any construction suitable to the purposes of my invention. I prefer, however, to have it comprise the radial stays 10, which extend upwardly and outwardly with respect to the center post, a suitable rigid device, such as the wire 11, for connecting the inner ends of the stays, and the ropes 12, connecting the stays at intermediate points of their length and adapted to serve as a rest or bed for the limbs of the tree. The wire 11 and the ropes 12 may be connected to the stays 10 in any suitable manner, as by wrapping them around the stays and securing them in the manner illustrated, and the ends of the ropes 12 may be connected together by the hooks 13, one of which is shown in detail in Fig. 3.

14 indicates a slide. This slide 14 is preferably in the form of a ring, so as to enable it to surround the post 1 and slide or move up and down, and it is connected with the cradle 9 by cables 15, which extend up and over the sheaves 8 and down to the cradle 9, to which they are connected, preferably through the medium of the hooks 16, which are similar to the hooks 13, and are designed to engage the portions of ropes 12, which are wrapped around the stay 10, as shown.

In virtue of hooks 13 being employed to connect the ends of the ropes 12 it will be seen that when it is desirable to suit the cradle to the limbs of a certain tree additional pieces of rope (not illustrated) may be arranged between the ends of the pieces of rope 12 and may be connected thereto by hooks, as 13.

In using my improved device the center post 1 is lashed to the tree-trunk at such points as not to interfere with the movements of the slide 14 and cable 15 or is otherwise secured in its upright position at the side of the tree-trunk. The cradle 9 now rests beneath the limbs of the tree, which, by reason of the weight of the fruit, hang down, and in adjusting the device the slide 14 is drawn down to raise the cradle up to the limbs, and the downward movement of the slide is then continued to raise the limbs, which rest on the ropes 12 between the stays, up to their natural position, that is to say, about the position they occupy when not laden with fruit. The slide 14 is then secured against vertical movement in any suitable manner, as by connecting a rope (not shown) at one end to it and at its opposite end to the center post, when the cradle and the limbs resting thereon will be supported in their adjusted positions.

When the device is placed in its operative position with respect to a tree before the same becomes laden with fruit, it is obvious that the cradle 9 will be adjustably fixed in a position directly below the limbs in their natural position, so as to retain the limbs in such position after they are laden.

It will be seen from the foregoing that my improved device is very simple in construction and easy to adjust to raise the limbs of a tree, and that it will support the heavily-laden trees in such a manner as to effectually prevent breakage of the same.

Having described my invention, what I claim is—

1. In a device for supporting the limbs of trees, the combination of a post or upright, the limb-supporting cradle, a sheave supported on the post or upright, a slide arranged on the post or upright and a cable connected to the cradle and slide and taking over the sheave; the said slide being adapted to be secured against movement, substantially as and for the purpose set forth.

2. In a device for supporting the limbs of trees, the combination of a post or upright and a limb-supporting cradle suspended from the post or upright and comprising radially-extending stays and ropes connecting the stays and adapted to serve as a rest for the tree-limbs, substantially as specified.

3. In a device for supporting the limbs of trees, the combination of a post or upright, a disk secured on the post or upright and carrying sheaves, a slide arranged on the post or upright, the limb-supporting cradle suspended from the post or upright and comprising radially-extending stays and ropes connecting the stays and adapted to serve as a rest for the tree-limbs, and cables connected to the stays of the cradle and to the slide and taking over the sheaves; the said slide being adapted to be secured against movement, substantially as specified.

EDWARD MORGAN.

Witnesses:
L. B. CRAWFORD,
L. CRAGHEAD.